United States Patent
Zhang

(10) Patent No.: US 10,749,626 B2
(45) Date of Patent: Aug. 18, 2020

(54) METHOD AND DEVICE FOR UPLINK TRANSMISSION BASED ON NETWORK COMMUNICATION

(71) Applicant: Shanghai Langbo Communication Technology Company Limited, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 109 days.

(21) Appl. No.: 16/178,972

(22) Filed: Nov. 2, 2018

(65) Prior Publication Data

US 2019/0074926 A1     Mar. 7, 2019

Related U.S. Application Data

(63) Continuation of application No. PCT/CN2017/080766, filed on Apr. 17, 2017.

(30) Foreign Application Priority Data

May 14, 2016    (CN) .......................... 2016 1 0321422

(51) Int. Cl.
  *H04L 1/00*     (2006.01)
  *H04L 1/16*     (2006.01)
  (Continued)

(52) U.S. Cl.
  CPC ............ *H04L 1/0004* (2013.01); *H04L 1/001* (2013.01); *H04L 1/0025* (2013.01);
  (Continued)

(58) Field of Classification Search
  CPC ..... H04L 1/0004; H04L 1/001; H04L 1/0025; H04L 1/1657; H04L 1/1812; H04L 1/1822; H04L 1/1896
  See application file for complete search history.

(56) References Cited

U.S. PATENT DOCUMENTS

2013/0016689 A1    1/2013  Jeong et al.
2013/0107838 A1*   5/2013  Li .................... H04W 72/0453
                                              370/329

(Continued)

FOREIGN PATENT DOCUMENTS

CN          102291826 A     12/2011
CN          103826310 A      5/2014
CN          105636233 A      6/2016

*Primary Examiner* — Mewale A Ambaye
(74) *Attorney, Agent, or Firm* — Maschoff Brennan

(57) ABSTRACT

The present disclosure discloses a method and device in wireless communication. The UE transmits the first radio signal in a first time window. The first radio signal comprises at least first information of first information and first data. The first information is used to determine whether the UE detects the first signaling in a second time window. In the present disclosure, the UE indicates whether the first signaling is detected at a subsequent time by the first radio signal. The present disclosure can reduce the number of blind detections performed by the UE, reduce the complexity of the UE, save power consumption of the UE, and prolong the standby time of the UE.

14 Claims, 4 Drawing Sheets

(51) Int. Cl.
   *H04L 1/18*      (2006.01)
   *H04W 72/04*     (2009.01)
   *H04L 27/26*     (2006.01)
   *H04L 5/00*      (2006.01)

(52) U.S. Cl.
   CPC .......... *H04L 1/0026* (2013.01); *H04L 1/1657* (2013.01); *H04L 1/1671* (2013.01); *H04L 1/1812* (2013.01); *H04L 1/1896* (2013.01); *H04W 72/0446* (2013.01); *H04L 1/1822* (2013.01); *H04L 5/0091* (2013.01); *H04L 27/2602* (2013.01); *Y02D 70/12* (2018.01)

(56) References Cited

U.S. PATENT DOCUMENTS

| | | | |
|---|---|---|---|
| 2016/0173239 A1* | 6/2016 | Kim | H04L 1/1812 370/329 |
| 2017/0019924 A1* | 1/2017 | Wang | H04W 74/0808 |
| 2019/0280746 A1* | 9/2019 | Zhang | H04B 7/0413 |

* cited by examiner

METHOD AND DEVICE FOR UPLINK TRANSMISSION BASED ON NETWORK COMMUNICATION

CROSS REFERENCE TO RELATED APPLICATION

This application is a continuation of International Application No. PCT/CN2017/080766, filed Apr. 17, 2017, claiming the priority benefit of Chinese Patent Application Serial Number 201610321422.8, filed on May 14, 2016, the full disclosures of which are incorporated herein by reference.

BACKGROUND

Technical Field

The present disclosure relates to a method for transmitting radio signals in a wireless communication system, and in particular to a method and device for uplink transmission based on cellular network communication.

Related Art

In a conventional digital modulation-based wireless communication system, such as a 3rd Generation Partner Project (3GPP) cellular system, uplink radio signals are sent based on scheduling of a base station. For the next generation of wireless communication systems, Internet of Things (IoT) communication may become an important application scenario.

The characteristics of the IoT communication include: the number of terminal devices is very large, the standby time supported by the terminal device is long (with low power consumption), the cost of the terminal device is low, and so on. The conventional scheduling-based uplink transmission is no longer applicable to the IoT because:

the signaling required for downlink scheduling can seriously reduce transmission efficiency, and in particular, it is considered that a typical number of information bits included in the uplink transmission for an IoT device is usually small;

the power consumption of the terminal device is increased, and the standby time is reduced, wherein in the existing system, the terminal device can perform uplink transmission by signaling such as a Scheduling Request (SR) first; and the uplink transmission delay is increased, wherein in some special scenarios, IoT communication requires lower transmission delays, while the existing scheduling-based uplink transmission cannot meet this requirement.

In response to the above problems, Contention Based (CB) uplink transmission is proposed, that is, the UE does not need to get scheduling information from the base station before uplink transmission. If no collision occurs between two or more UEs, the base station can correctly decode the uplink information.

SUMMARY

In one embodiment, the inventors have found through researches that one of the advantages of CB uplink transmission is that the CB uplink transmission can effectively reduce both the overhead and the collision of control signalings when the number of users required to be served by the base station is in large number and the time-frequency resources required by each user are less. However, the CB uplink transmission obviously causes interference between users, which in turn affects certain performance. Meanwhile, when the number of UEs is small, or the uplink data packet to be transmitted has high requirements for robustness, the UE under the CB uplink transmission may also transfer to Grant Based (GB) uplink transmission to improve performance. Therefore, when the UE changes the CB uplink transmission to the GB uplink transmission, the base station needs to obtain corresponding information. At the same time, considering the problem of reducing the complexity of the terminal device and reducing the power consumption, when the transmission mode changes, the UE does not need to monitor the downlink control signaling in each subframe like the traditional UE.

In view of the above problem, the present disclosure provides a solution. It should be noted that, in the case of no conflict, the embodiments of the present disclosure and the features in the embodiments may be combined with each other arbitrarily. For example, embodiments in the UE of the present disclosure and the features in the embodiments may be applied to a base station, and vice versa.

The present disclosure discloses a method in user equipment for wireless communication, including:

transmitting a first radio signal in a first time window, wherein the first radio signal includes at least first information between first information and first data;

wherein the first information is used to determine whether the UE detects a first signaling in a second time window; the second time window is behind the first time window in time-domain; the first signaling includes first scheduling information; and the first scheduling information includes at least one of a Modulation and Coding Scheme (MCS), a New Data Indicator (NDI), a Redundancy Version (RV), a Hybrid Automatic Repeat Request (HARQ) process number, scheduled time domain resources, and scheduled frequency domain resources.

In one embodiment, in the Long Term Evolution (LTE) and Long Term Evolution Advanced (LTE-A) systems, the uplink transmission of the UE needs to be completed by the base station scheduling. Therefore, when the UE needs to perform the uplink data transmission, the UE performs blind detection of Uplink Grant (UL-Grant) on each subframe to determine resources corresponding to the transmitted uplink data allocated by the base station. For the CB uplink transmission, the UE obtains the resources for transmitting the uplink data by itself without blind detection of the UL-Grant. When the UE can simultaneously support the CB uplink transmission and the GB uplink transmission, according to the reception quality of the uplink data, the robustness requirement of the transmitted uplink data, and other reasons, the uplink transmission mode is switched, and the base station needs to know the handover request of the UE. One of the design purposes of the above method is to implement the handover request of the base station to acquire the uplink transmission mode of the UE.

In one embodiment, another feature of the above method is that the first information is sent together with the first data, and the first data is a CB uplink transmission. In this way, the efficiency of the uplink transmission is improved without additionally allocating resources for the first information.

In one embodiment, the transmission channel corresponding to the first data is an Uplink Shared Channel (UL-SCH).

In one embodiment, the first data is transmitted on a Physical Uplink Shared Channel (PUSCH).

In one embodiment, the first radio signal is transmitted on a Narrow Band Physical Uplink Shared Channel (NB-PUSCH).

In one embodiment, the logical channel corresponding to the first data includes at least one of a Common Control Channel (CCCH), a Dedicated Control Channel (DCCH), and a Dedicated Traffic Channel (DTCH).

In one embodiment, the first information is used by a first cell to determine whether the UE detects the first signaling in a second time window, and the first cell is a serving cell of the UE.

In one embodiment, the first signaling is an UL-grant.

In one embodiment, the first signaling is a Downlink Control Information (DCI).

In one embodiment, a DCI format (Format) adopted by the first signaling is one of Format 0, Format 3, Format 3A, Format 4, Format N0, Format 6-0A, and Format 6-0B.

In one embodiment, the first signaling is a physical layer signaling.

In one sub-embodiment of this embodiment, the first signaling is an UE-specific physical layer signaling.

In one embodiment, the first signaling is a DCI identified by a given ID (Identification) assigned to the UE, where the given ID is an integer.

In one embodiment, the first information is indicated by an information bit.

In one embodiment, the second time window is implicitly indicated by the first time window.

In one sub-embodiment of this embodiment, the first time window starts at subframe # n1, and the second time window starts at subframe #(n1+m1), where n1 is a positive integer not less than 0, and m1 is a positive integer not less than 1 and is fixed.

In one sub-embodiment of this embodiment, the first time window ends in subframe # n2, and the second time window starts at subframe #(n2+m2), where n2 is a positive integer not less than 0, m2 is a positive integer not less than 1 and is fixed.

In one embodiment, the length of the first time window is K1 milliseconds (ms), where K1 is a positive integer not less than 1.

In one sub-embodiment of this embodiment, the K1 is a positive integer multiple of 2.

In one embodiment, the length of the second time window is K2 milliseconds, where K2 is a positive integer not less than 1.

In one embodiment, the first information indicates whether the UE requests to be scheduled; if the UE requests for scheduling, the UE detects the first signaling in a second time window; otherwise the UE does not detect the first signaling in the second time window.

In one embodiment, the first information indicates whether the UE detects the first signaling.

In one sub-embodiment of this embodiment, if the first information indicates that the first signaling is detected, the UE detects the first signaling in a second time window; otherwise the UE does not detect the first signaling in the second time window.

In one embodiment, the first information is physical layer information.

In one sub-embodiment of this embodiment, the first information is physical layer information, which means that the first information can be understood in a physical layer.

In one sub-embodiment of this embodiment, the first information is physical layer information, which means that the first information is terminated at a physical layer.

In one embodiment, the first radio signal further includes third scheduling information of the first data, and the third scheduling information includes at least one of an MCS, an NDI, an RV and a HARQ process number.

In one sub-embodiment of this embodiment, the above method is characterized in that, when the UE is in CB uplink transmission, in addition to transmitting data, the UE needs to transmit a scheduling scheme corresponding to the transmission data to the base station, so that the base station performs decoding.

According to an aspect of the present disclosure, the above method is characterized by including:

detecting the first signaling in the second time window; and transmitting a second radio signal;

wherein the first scheduling information comprised in the first signaling is for the second radio signal, and the first information is used to determine that the user equipment detects the first signaling in the second time window.

In one embodiment, the above method is characterized in that the UE confirms that the uplink data transmission needs to be performed by scheduling of the base station, so that the UE needs to detect the first signaling in the second time window, and obtains scheduling information of the second radio signal by the first signaling.

In one embodiment, the first signaling is used to determine whether a transmission block corresponding to the first data needs to be retransmitted.

In one sub-embodiment of this embodiment, the first signaling includes 1 bit as an NDI indication, where the NDI equaling to 1 indicates that the transmission block corresponding to the first data does not need to be retransmitted; and the NDI equaling to 0 indicates that the transmission block corresponding to the first data needs to be retransmitted.

In one embodiment, a transmission channel corresponding to the second radio signal is a UL-SCH.

In one embodiment, the second radio signal is transmitted on a PUSCH.

In one embodiment, the second radio signal is transmitted on a NB-PUSCH.

In one embodiment, a logical channel corresponding to the second radio signal includes at least one of CCCH, DCCH, and DTCH.

In one embodiment, the time-frequency resources occupied by the second radio signal are continuous in the time domain.

In one sub-embodiment of this embodiment, the duration of the time-frequency resources occupied by the second radio signal is no more than 1 millisecond in the time domain.

In one sub-embodiment of this embodiment, the duration of the time-frequency resources occupied by the second radio signal is equal to one of 2 ms, 4 ms, 8 ms, and 32 ms in the time domain.

In one embodiment, the time-frequency resources occupied by the second radio signal are continuous in the frequency domain.

In one sub-embodiment of this embodiment, the bandwidth occupied by the time-frequency resources in the frequency domain is no more than 180 kHz (kilohertz).

In one sub-embodiment of this embodiment, the bandwidth occupied by the time-frequency resources in the frequency domain is equal to one of 3.75 KHz, 15 KHz, 45 KHz, 90 KHz, 180 KHz.

In one embodiment, the time-frequency resources occupied by the second radio signal include a positive integer number of Resource Units (RUs).

In one sub-embodiment of this embodiment, the RU occupies one subcarrier bandwidth in frequency domain and occupies one multicarrier symbol in time domain.

In one subsidiary embodiment of this sub-embodiment, the multi-carrier symbol is an OFDM symbol.

In one subsidiary embodiment of this sub-embodiment, the multi-carrier symbol is an SC-FDMA symbol.

In one subsidiary embodiment of this sub-embodiment, the multi-carrier symbol is a Filter Bank Multi Carrier (FBMC) symbol.

In one subsidiary embodiment of this sub-embodiment, the subcarrier bandwidth is one of 15 kHz, 17.5 KHz, 17.06 KHz, 7.5 KHz, and 2.5 KHz.

According to an aspect of the present disclosure, the above method is characterized by including:

receiving a second signaling;

wherein the second signaling includes only a HARQ-ACK between a HARQ-ACK and second scheduling information, the HARQ-ACK indicates whether the first data is correctly decoded, the first radio signal includes the first information and the first data; and the second scheduling information includes an MCS, an NDI, an RV, a HARQ process number, scheduled time domain resources, and scheduled frequency domain resources.

In one embodiment, the above method is characterized in that when the UE performs CB uplink transmission, the UE does not need to monitor uplink scheduling information from the base station. In this scenario, it is more reasonable to design a channel for only transmitting the downlink HARQ-ACK of uplink data, that is, the second signaling.

In one embodiment, the first radio signal further includes third scheduling information of the first data, and the third scheduling information includes at least one of an MCS, an NDI, an RV, and a HARQ process number.

In one embodiment, the first information is used to determine that the UE does not detect the first signaling in the second time window.

In one embodiment, the second signaling is transmitted on a Physical Hybrid ARQ Indicator Channel (PHICH).

In one embodiment, the second signaling is transmitted on a given physical layer channel, and the given physical layer channel is only used to transmit the downlink HARQ-ACK of uplink data.

According to an aspect of the present disclosure, the above method is characterized by including:

self-determining target time-frequency resources in a first resource pool; and transmitting a third radio signal on the target time-frequency resources;

wherein the first information is used to determine that the user equipment does not detect the first signaling in the second time window, the third radio signal includes at least one of second information and second data; the second information is used to determine whether the user equipment detects the first signaling in a third time window; and the third time window is behind the target time-frequency resources in time-domain.

In one embodiment, the above method has the advantages that, when the UE does not need to perform uplink data transmission by the base station scheduling, the UE determines the target time-frequency resources by itself using the CB uplink transmission mode, and transmits a third radio signal on the target time-frequency resources to save the overhead of control signaling of the system.

In one embodiment, the transmission channel corresponding to the second data is a UL-SCH.

In one embodiment, the second data is transmitted on a PUSCH.

In one embodiment, the third radio signal is transmitted on a NB-PUSCH.

In one embodiment, the logical channel corresponding to the second data includes at least one of CCCH, DCCH, and DTCH.

In one embodiment, a receiver of the third radio signal acquires the third radio signal by blind detection in the first resource pool.

In one sub-embodiment, the blind detection is coherent detection for the corresponding characteristic sequence.

In one embodiment, the first resource pool is configured by higher-layer signaling.

In one embodiment, the first resource pool is configured by cell-specific downlink signaling.

In one sub-embodiment of this embodiment, the first resource pool is common to the cell, which means that all the UEs with corresponding capabilities in the cell can occupy the first resource pool.

In one embodiment, the first resource pool is specific to a first UE group, and the UE belongs to the first UE group.

In one sub-embodiment of this embodiment, the first resource pool is specific to the first UE group, which means that the UE of the first UE group can occupy the time-frequency resources in the first resource pool.

In one embodiment, the first resource pool includes the target time-frequency resources.

In one embodiment, the time-frequency resources occupied by the target time-frequency resources are continuous in the time domain.

In one sub-embodiment of this embodiment, the duration of the occupied time-frequency resources in the time domain is no more than 1 millisecond.

In one sub-embodiment of this embodiment, the duration of the occupied time-frequency resources in the time domain is equal to one of 2 ms, 4 ms, 8 ms, 32 ms.

In one embodiment, the time-frequency resources occupied by the target time-frequency resources are continuous in the frequency domain.

In one sub-embodiment of this embodiment, the bandwidth occupied by the occupied time-frequency resources in the frequency domain is no more than 180 kHz (kilohertz).

In one sub-embodiment of this embodiment, the bandwidth occupied by the occupied time-frequency resources in the frequency domain is equal to one of 3.75 KHz, 15 KHz, 45 KHz, 90 KHz, and 180 KHz.

In one embodiment, the time-frequency resources occupied by the target time-frequency resources include a positive integer number of Resource Units (RUs).

In one sub-embodiment of this embodiment, the RU occupies one subcarrier bandwidth in the frequency domain and occupies the duration of one multicarrier symbol in the time domain.

In one subsidiary embodiment of this sub-embodiment, the multi-carrier symbol is an OFDM symbol.

In one subsidiary embodiment of this sub-embodiment, the multi-carrier symbol is an SC-FDMA symbol.

In one subsidiary embodiment of this sub-embodiment, the multi-carrier symbol is an FBMC symbol.

In one subsidiary embodiment of this sub-embodiment, the subcarrier bandwidth is one of 15 kHz, 17.5 KHz, 17.06 KHz, 7.5 KHz, 2.5 KHz.

According to an aspect of the present disclosure, the above method is characterized by including:

receiving third information in a fourth time window;

wherein the third information is used to determine the first information.

In one embodiment, the third information is used to indicate a payload of control signaling of a serving cell of the UE.

In one embodiment, the above embodiment has the advantages that, even if the UE needs the scheduling of the base station to perform uplink data transmission, the base station cannot transmit scheduling information to the UE in time due to excessive control signaling load or other reasons. The third information helps the UE determine whether the base station transmits the first signaling even if the first information indicates that the UE needs the scheduling information, and then determines whether the UE needs to detect the first signaling, thereby preventing the UE from blindly detecting the first signaling unnecessarily.

In one sub-embodiment of this embodiment, the third information includes 1-bit information, wherein when the bit is "1", the payload is high, and the first scheduling information of the UE is not included in the second time window; when the bit is "0", the payload is low, and the first scheduling information of the UE is included in the second time window.

In one sub-embodiment of this embodiment, the third information includes a positive integer Q, where the Q is a positive integer not less than 0 and not greater than 100, and the Q is used to indicate a percentage of time-frequency resources occupied by the serving cell of the UE for transmitting control signaling.

In one subsidiary embodiment of the sub-embodiment, the Q is not greater than a first threshold, and the first scheduling information of the UE is not included in the second time window; the Q is greater than a first threshold, and the first scheduling information of the UE is included in the second time window. The first threshold is fixed or configured by higher-layer signaling, and the first threshold is a positive integer not less than 0 and not greater than 100.

In one embodiment, the third information is used to indicate whether the first scheduling information of the UE is included in the second time window.

In one embodiment, the above embodiment has the advantage that the base station further confirms whether the first signaling will be sent, thereby preventing the power waste of the UE caused by unnecessary blind detecting.

In one embodiment, the third information includes K2, and the K2 is used to indicate that the second time window occupies K2 milliseconds in the time domain, where K2 is a positive integer greater than 0.

In one embodiment, the above embodiment has the advantage that the UE can control the consumed time of blind detection for the first signaling, avoiding power consumption resulted from the fact that blind detection cannot be performed on the first signaling for a long time.

In one embodiment, the third information includes J1, and the J1 is used to indicate that the time interval between the end time of the first time window and the start time of the second time window is J1 (ms), where J1 is a positive integer greater than 0.

The above embodiment has the advantage that the UE can control the time of blind detection for the first signaling, avoiding the large power consumption resulted from blind detection in each subframe after the first time window.

In one embodiment, the third information includes J3, and the J3 is used to indicate that the time interval between the end time of the fourth time window and the start time of the second time window is J3 (ms), where J3 is a positive integer greater than 0.

In one embodiment, the third information includes J4, and the J4 is used to indicate that the time interval between the end time of the fourth time window and the start time of the third time window is J4 (ms), where J4 is a positive integer greater than 0.

In one embodiment, the above two embodiments have the advantages that the UE can control the time of blind detecting the first signaling, avoiding the large power consumption resulted from blind detection in each subframe after the fourth time window.

The present disclosure discloses a method in a base station for wireless communication, including:

receiving a first radio signal in a first time window, wherein the first radio signal includes at least first information between first information and first data;

wherein the first information is used to determine whether a transmitter of the first information detects a first signaling in a second time window; the second time window is behind the first time window in time-domain; the first signaling includes first scheduling information; and the first scheduling information includes at least one of a Modulation and Coding Scheme (MCS), a New Data Indicator (NDI), a Redundancy Version (RV), a Hybrid Automatic Repeat Request (HARQ) process number, scheduled time domain resources, and scheduled frequency domain resources.

In one embodiment, the base station determines, according to the first information, whether the transmitter of the first information detects the first signaling in a second time window.

According to an aspect of the present disclosure, the above method is characterized by including:

transmitting the first signaling in the second time window; and receiving a second radio signal;

wherein the first scheduling information comprised in the first signaling is for the second radio signal, and the first information is used to determine that the transmitter of the first information detects the first signaling in the second time window.

According to an aspect of the present disclosure, the above method is characterized by including:

transmitting a second signaling;

wherein the second signaling includes only a HARQ-ACK between a HARQ-ACK and the second scheduling information, the HARQ-ACK indicates whether the first data is correctly decoded, the first radio signal includes the first information and the first data; and the second scheduling information includes an MCS, an NDI, an RV, a HARQ process number, scheduled time domain resources, and scheduled frequency domain resources.

In one embodiment of the above aspect, the first information is used to determine that the UE does not detect the first signaling in the second time window.

According to an aspect of the present disclosure, the above method is characterized by including:

performing blind detection in a first resource pool; and receiving a third radio signal in target time-frequency resources;

wherein the first information is used to determine that a transmitter of the first information does not detect the first signaling in the second time window; the target time-frequency resources belong to the first resource pool; the third radio signal includes at least one of second information and second data; the second information is used to determine whether the transmitter of the first information detects the first signaling in a third time window; and the third time window is behind the target time-frequency resources in time-domain.

In one embodiment, in the above method, although the base station configures the first resource pool, the base station does not determine where the target time-frequency resources are located in the first resource pool, and also does not know how many terminals in the target time-frequency resources will transmit upstream data. Therefore, the base station receives the third radio signal by the blind detection.

In one embodiment, the first resource pool includes a positive integer number of time-frequency resource blocks.

In one sub-embodiment of this embodiment, the target time-frequency resources occupy one of the positive integer number of time-frequency resource blocks.

In one sub-embodiment of this embodiment, the target time-frequency resources occupy a positive integer number of time-frequency resource blocks.

In one sub-embodiment of this embodiment, the base station determines the location of the target time-frequency resources in the first resource pool by blind detection when performing blind detection in the first resource pool.

In one sub-embodiment of this embodiment, the base station determines the location of the target time-frequency resources in the first resource pool by detecting the received signal power when performing blind detection in the first resource pool.

In one embodiment, the base station receives R radio signals in the target time-frequency resources, and one of the R radio signals is the third radio signal, where R is a positive integer not less than 1.

In one sub-embodiment of this embodiment, the R radio signals are sent by R terminals, respectively.

In one sub-embodiment of this embodiment, when the base station receives the third radio signal in the target time-frequency resources, the base station also performs the blind detection in the target time-frequency resource block.

In one sub-embodiment of this embodiment, when the base station receives the third radio signal in the target time-frequency resources, the base station also performs the blind detection on the G characteristic sequences in the target time-frequency resource block, the base station determines that R characteristic sequences from the G characteristic sequences are sent, and the R characteristic sequences are in one-to-one correspondence with the R radio signals.

In one subsidiary embodiment of the sub-embodiment, the characteristic sequence is a Reference Signal (RS) sequence of the RS of a corresponding radio signal.

In one subsidiary embodiment of this sub-embodiment, the blind detection is a coherent detection for a corresponding characteristic sequence.

According to an aspect of the present disclosure, the above method is characterized by including:
transmitting third information in a fourth time window;
wherein the third information is used to determine the first information.

The present disclosure discloses user equipment for wireless communication, including:
a first transceiver transmitting a first radio signal in a first time window, the first radio signal includes at least first information between first information and first data;
wherein the first information is used to determine whether the user equipment detects a first signaling in a second time window; the second time window is behind the first time window in time-domain; the first signaling includes first scheduling information; and the first scheduling information includes at least one of a Modulation and Coding Scheme (MCS), a New Data Indicator (NDI), a Redundancy Version (RV), a Hybrid Automatic Repeat Request (HARQ) process number, scheduled time domain resources, and scheduled frequency domain resources.

In one embodiment, the above user equipment is characterized by including:
a first receiver detecting the first signaling in the second time window;
wherein the first information is used to determine that the user equipment detects the first signaling in the second time window, and the first scheduling information comprised in the first signaling is for the second radio signal; the first transceiver further transmits the second radio signal.

In one embodiment, the above user equipment is characterized in that the first transceiver further self-determines target time-frequency resources in a first resource pool; and transmits a third radio signal on the target time-frequency resources; the first information is used to determine that the user equipment does not detect the first signaling in the second time window, the third radio signal includes at least one of the second information and the second data; the second information is used to determine whether the user equipment detects the first signaling in a third time window; and the third time window is behind the target time-frequency resources in time-domain.

In one embodiment, the above user equipment is characterized in that the first transceiver further receives third information in a fourth time window; the third information is used to determine the first information.

In one embodiment, the above user equipment is characterized by including:
a second receiver receiving a second signaling;
wherein the second signaling includes only a HARQ-ACK between a HARQ-ACK and second scheduling information, the HARQ-ACK indicates whether the first data is correctly decoded, the first radio signal includes the first information and the first data; and the second scheduling information includes an MCS, an NDI, an RV, a HARQ process number, scheduled time domain resources, and scheduled frequency domain resources.

The present disclosure discloses a base station for wireless communication, including:
a second transceiver receiving a first radio signal in a first time window, wherein the first radio signal includes at least first information between first information and first data;
wherein the first information is used to determine whether a transmitter of the first information detects a first signaling in a second time window; the second time window is behind the first time window in time-domain; the first signaling includes first scheduling information; and the first scheduling information includes at least one of a Modulation and Coding Scheme (MCS), a New Data Indicator (NDI), a Redundancy Version (RV), a Hybrid Automatic Repeat Request (HARQ) process number, scheduled time domain resources, and scheduled frequency domain resources.

In one embodiment, the above base station is characterized by including:
a first transmitter transmitting the first signaling in the second time window;
wherein the first scheduling information comprised in the first signaling is for a second radio signal, and the first information is used to determine that a transmitter of the first information detects the first signaling in the second time window; and the second transceiver further receives the second radio signal; and the first information is used to determine that the user equipment detects the first signaling in the second time window.

In one embodiment, the above base station is characterized in that the second transceiver further performs blind detection in a first resource pool, and receives a third radio signal in target time-frequency resources; the first information is used to determine that a transmitter of the first information does not detect the first signaling in the second time window; the target time-frequency resources belong to the first resource pool; the third radio signal includes at least one of second information and second data; the second information is used to determine whether the transmitter of the first information detects the first signaling in a third time window; and the third time window is behind the target time-frequency resources in time-domain.

In one embodiment, the above base station is characterized in that the second transceiver further transmits third information in a fourth time window; the third information is used to determine the first information.

In one embodiment, the above base station is characterized by including:

a second transmitter transmitting a second signaling;

wherein the second signaling includes only a HARQ-ACK between a HARQ-ACK and second scheduling information, the HARQ-ACK indicates whether the first data is correctly decoded, the first radio signal includes the first information and the first data; and the second scheduling information includes an MCS, an NDI, an RV, a HARQ process number, scheduled time domain resources, and scheduled frequency domain resources.

In one embodiment, the present disclosure has the following technical advantages over the prior art.

The base station determines, by the first information, whether the UE needs to monitor the first signaling (for uplink grant) in a subsequent subframe in which the first information is sent. Further, the base station can determine whether to transmit the first signaling for the UE. On the one hand, the overhead occupied by the first signaling is saved, and on the other hand, the standby time of the UE is increased. In addition, the uplink transmission performance degradation caused by the CB uplink transmission when the number of scheduled UEs is too large or the allocated first resource pool is too small is avoided.

The base station may confirm, by the third information, to the UE whether the dynamic scheduling information is to be sent, and the start time when the dynamic scheduling information is sent, so that the UE can determine whether to perform blind detection of the DCI and where to detect, which is more efficient and will not reduce the power consumption caused by unnecessary blind detection.

The first data and the first information are sent on a time-frequency resource block simultaneously by the first radio signal, reducing a transmission delay.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical schemes of the present disclosure will be further described in detail below with reference to the accompanying drawings. It should be noted that the embodiments of the present disclosure and the features in the embodiments may be combined with each other without conflict.

Embodiment 1

Figure 1:
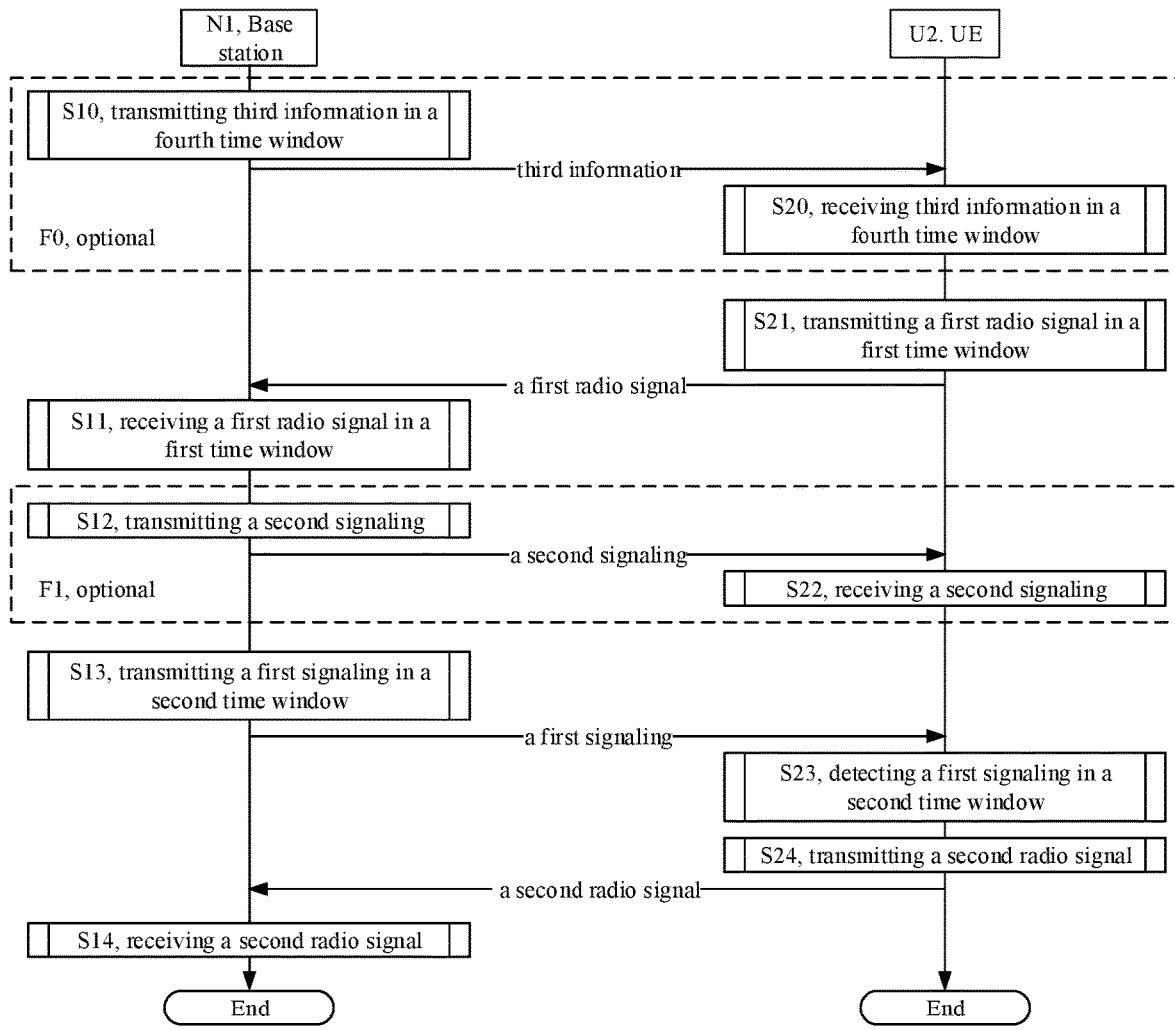
FIG. 1 is a flow chart illustrating uplink transmission according to an embodiment of the present disclosure.

Embodiment 1 illustrates a flow chart of uplink transmission, as shown in FIG. 1. In FIG. 1, base station N1 is the maintenance base station of the serving cell of UE U2, and the steps identified in block F0 and block F1 are optional, respectively.

The base station N1 transmits third information in a fourth time window in step S10, receives a first radio signal in a first time window in step S11, transmits a second signaling in step S12, transmits a first signaling in a second time window in step S13, and receives a second radio signal in step S14.

The UE U2 receives third information in a fourth time window in step S20, transmits a first radio signal in a first time window in step S21, receives a second signaling in step S22, detects a first signaling in a second time window in step S23, and transmits a second radio signal in step S24.

In Embodiment 1, the first radio signal comprises at least first information between first information and first data; the first information is used to determine the UE U2 detects the first signaling in the second time window; the second time window is behind the first time window in time-domain; the first signaling comprises first scheduling information; and the first scheduling information comprises at least one of an MCS an NDI, an RV, an HARQ process number, scheduled time domain resources, and scheduled frequency domain resources; the first scheduling information comprised in the first signaling is for the second radio signal; the second signaling comprises only a HARQ-ACK between a HARQ-ACK and second scheduling information, the HARQ-ACK indicates whether the first data is correctly decoded, the first radio signal comprises the first information and the first data; and the second scheduling information comprises an MCS, an NDI, an RV, a HARQ process number, scheduled time domain resources, and scheduled frequency domain resources; the third information is used to determine the first information.

In Embodiment 1, the base station N1 determines that the UE U2 detects the first signaling in the second time window according to the first information.

In one sub-embodiment of Embodiment 1, the first information indicates that the UE U2 requires to be scheduled.

In one sub-embodiment of Embodiment 1, the first information indicates that the UE U2 detects the first signaling in the second time window.

In one sub-embodiment of Embodiment 1, the third information indicates the loading degree of a current control channel of the serving cell of the UE U2, and the UE U2 determines the first information according to the third information.

In one sub-embodiment of Embodiment 1, the third information indicates a system bandwidth of a serving cell of the UE U2 (the system bandwidth is greater than a given threshold), and the UE U2 determines the first information according to the system bandwidth of the serving cell of the UE U2.

In one sub-embodiment of Embodiment 1, the third information indicates that the proportion of the time-frequency resources occupied by the serving cell of the UE for transmitting control signaling is less than a given threshold, where the given threshold is predefined or system configured.

In one sub-embodiment of Embodiment 1, the first information indicates that the UE detects the first signaling, and the third information indicates that the proportion of the time-frequency resources occupied by the serving cell of the UE for transmitting control signaling is less than a given threshold, where the given threshold is predefined or system configured.

Embodiment 2

Figure 2:
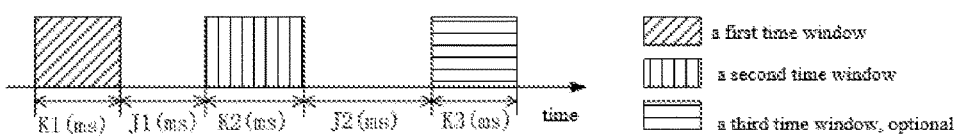
FIG. 2 is a schematic diagram illustrating the relative positions of the first time window, the second time window and the third time window according to an embodiment of the present disclosure.

Embodiment 2 is a schematic diagram illustrating the relative positions of the first time window, the second time window and the third time window according to an embodiment of the present disclosure, as shown in FIG. 2. In FIG. 2, the oblique line identifies the first time window, the vertical line identifies the second time window, and the horizontal line identifies the third time window, wherein the third time window is optional.

In FIG. 2, the second time window is behind the first time window in the time domain, and the third time window is behind the second time window in the time domain. The first time window occupies K1 (ms) in the time domain, the second time window occupies K2 (ms) in the time domain, and the third time window occupies K3 (ms) in the time domain. The end time of the first time window is spaced from the start time of the second time window by J1 (ms), and the end time of the second time window is spaced from the start time of the third time window by J2 (ms), where K1, K2, K3, J1 and J2 are all positive integers.

Embodiment 3

Figure 3:
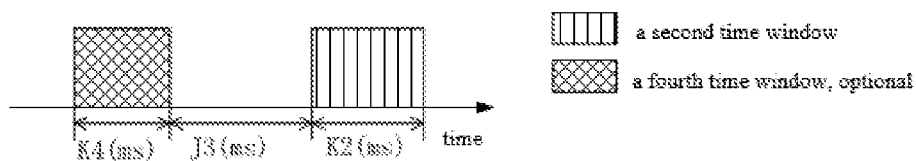
FIG. 3 is a schematic diagram illustrating the relative positions of the second time window and the fourth time window according to an embodiment of the present disclosure.

Embodiment 3 illustrates a schematic diagram illustrating the relative positions of the second time window and the fourth time window according to an embodiment of the present disclosure, as shown in FIG. 3. In FIG. 3, the vertical line identifies the second time window and the cross line identifies the fourth time window, wherein the fourth time window is optional.

As shown in FIG. 3, the second time window is behind the fourth time window in the time domain, and the second time window occupies K2 (ms) in the time domain, and the fourth time window occupies K4 (ms) in the time domain. The end time of the fourth time window is spaced from the start time of the second time window by J3 (ms), where K2, K4 and J3 are all positive integers.

Embodiment 4

Figure 4:
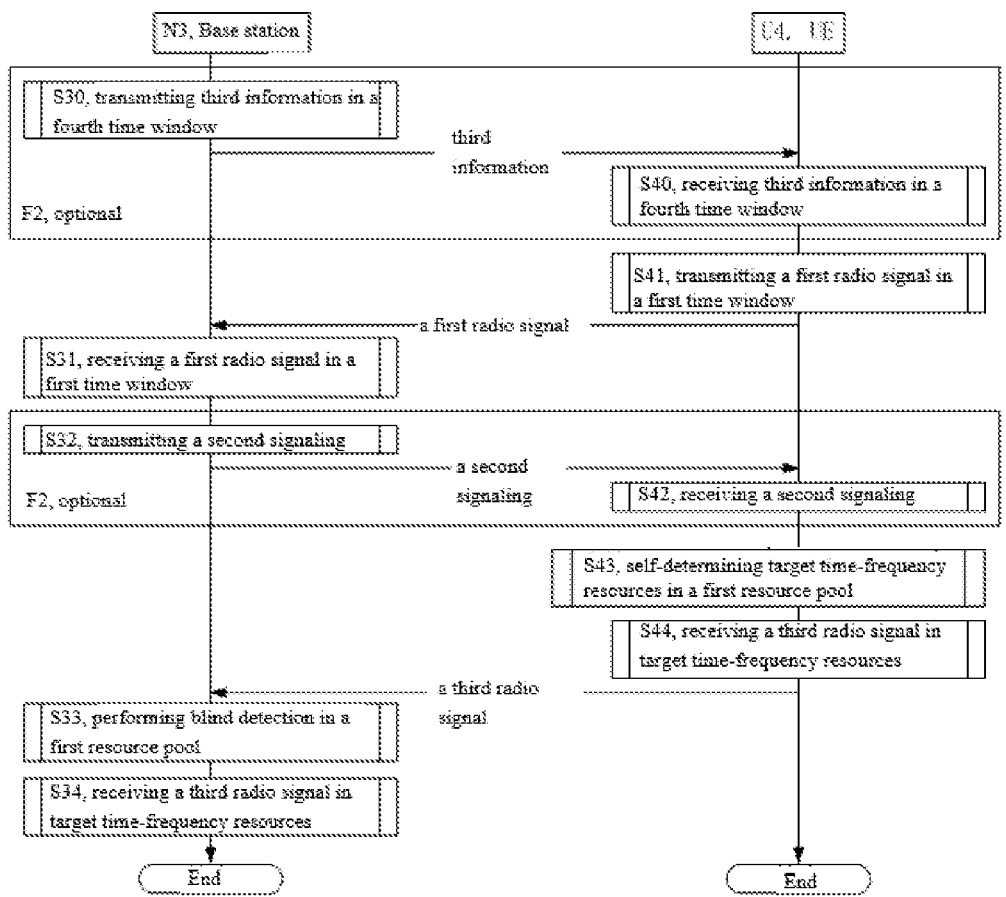
FIG. 4 is a flow chart illustrating uplink transmission according to another embodiment of the present disclosure.

Embodiment 4 is another flow chart of uplink transmission, as shown in FIG. 4. In FIG. 4, base station N3 is the maintenance base station of the serving cell of UE U4, and the steps identified in block F2 and block F3 are optional, respectively.

The base station N3 transmits third information in a fourth time window in step S30, receives a first radio signal in a first time window in step S31, transmits a second signaling in step S32, performs the blind detection in a first resource pool in step S33, and receives a third radio signal in target time-frequency resources in step S34.

The UE U4 receives third information in a fourth time window in step S40, transmits a first radio signal in a first time window in step S41, receives a second signaling in step S42, self-determines target time-frequency resources in a first resource pool in step S43, and transmits a third radio signal on the target time-frequency resources in step S44.

In Embodiment 4, the first radio signal comprises at least first information between first information and first data; the first information is used to determine whether the UE U4 detects a first signaling in the second time window; the second time window is behind the first time window in time-domain; the first signaling comprises first scheduling information; and the first scheduling information comprises at least one of an MCS, an NDI, an RV, a Hybrid Automatic Repeat Request (HARQ) process number, scheduled time domain resources, and scheduled frequency domain resources; the second signaling comprises only a HARQ-ACK between a HARQ-ACK and second scheduling information, the HARQ-ACK indicates whether the first data is correctly decoded, the first radio signal comprises the first information and the first data; and the second scheduling information comprises an MCS, an NDI, an RV, a HARQ process number, scheduled time domain resources, and scheduled frequency domain resources; the first information is used to determine that the UE U4 does not detect the first signaling in the second time window, the third radio signal comprises at least one of second information and second data; the second information is used to determine whether the UE U4 detects the first signaling in a third time window; and the third time window is behind the target time-frequency resources in time-domain; the third information is used to determine the first information.

In one sub-embodiment of Embodiment 4, the base station N3 determines that the UE U4 does not detect the first signaling in the second time window according to the first information.

In one sub-embodiment of Embodiment 4, the first information indicates that the UE U4 does not require to be scheduled.

In one sub-embodiment of Embodiment 4, the first information indicates that the UE U4 does not detect the first signaling.

Embodiment 5

Figure 5:
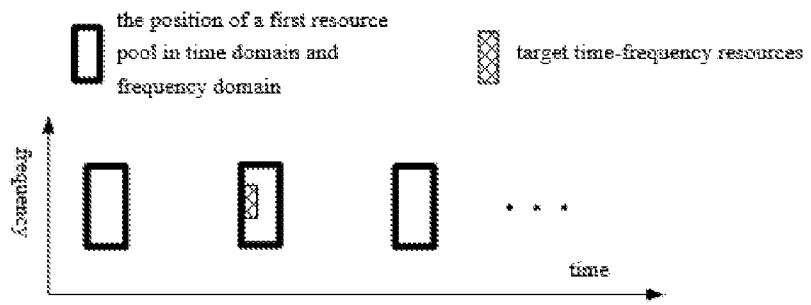
FIG. 5 is a schematic diagram illustrating a first resource pool according to an embodiment of the present disclosure.

Embodiment 5 illustrates a schematic diagram of a first resource pool, as shown in FIG. 5. The thick line box identifies the resources occupied by the first resource pool in both the time domain and the frequency domain, and the cross line identifies the target time-frequency resources.

In Embodiment 5, the time domain resources occupied by the first resource pool are distributed, and the target time-frequency resources are part of the resources occupied by the first resource pool in the time domain and the frequency domain.

Embodiment 6

Figure 6:
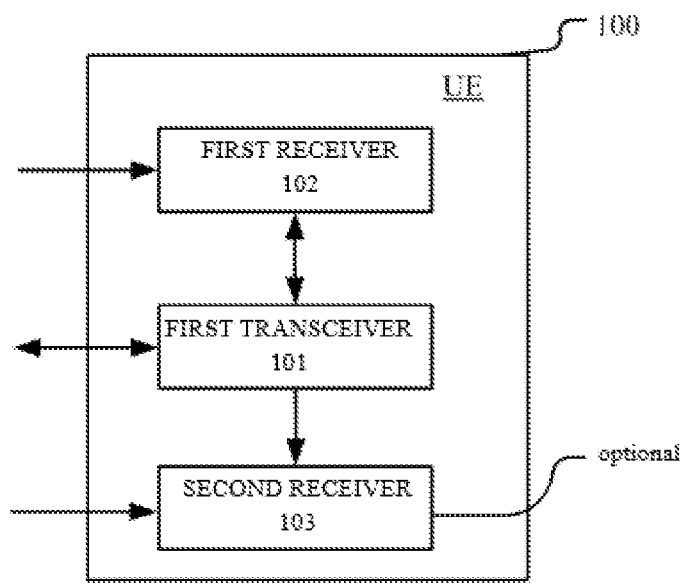
FIG. 6 is a block diagram illustrating the structure of a processing device in a UE according to an embodiment of the present disclosure.

Embodiment 6 is a block diagram illustrating the structure of a processing device in UE, as shown in FIG. 6. In FIG. 6, the UE processing device 100 includes a first transceiver 101, a first receiver 102, and a second receiver 103. The second receiver 103 is optional.

The first transceiver 101 transmits a first radio signal in a first time window, wherein the first radio signal includes at least first information between first information and first data.

In Embodiment 6, the first information is used to determine whether the UE detects a first signaling in a second time window; the second time window is behind the first time window in time-domain; the first signaling includes first scheduling information; and the first scheduling information includes at least one of an MCS, an NDI, an RV, a HARQ process number, scheduled time domain resources, and scheduled frequency domain resources.

In one embodiment, the first information includes 1 information bit.

If the first information is used to determine that the UE detects the first signaling in the second time window:

the first receiver 102 detects the first signaling in the second time window; and the first transceiver 101 transmits the second radio signal;

wherein, the first scheduling information comprised in the first signaling is for a second radio signal.

In one sub-embodiment of Embodiment 6, if the first information is used to determine that the UE does not detect the first signaling in the second time window, the first transceiver 101 further self-determines target time-frequency resources in a first resource pool; and transmits a third radio signal on the target time-frequency resources. The first information is used to determine that the UE does not detect the first signaling in the second time window, and the third radio signal includes at least one of the second information and the second data. The second information is used to determine whether the UE detects the first signaling in a third time window. The third time window is behind the target time-frequency resources in time-domain.

In one sub-embodiment of Embodiment 6, the first transceiver 101 further receives the third information in the fourth time window. The third information is used to determine the first information.

In one sub-embodiment of Embodiment 6, the UE processing device 100 further includes a second receiver 103 receiving the second signaling, wherein the second signaling includes only a HARQ-ACK between a HARQ-ACK and second scheduling information, the HARQ-ACK indicates whether the first data is correctly decoded, the first radio signal includes the first information and the first data; and the second scheduling information includes an MCS, an NDI, an RV, a HARQ process number, scheduled time domain resources, and scheduled frequency domain resources.

In one sub-embodiment of Embodiment 6, the UE processing device 100 further includes a second receiver 103. The second receiver 103 receives the second signaling if the first information is used to determine that the UE does not detect the first signaling in the second time window. The second signaling includes only a HARQ-ACK between a HARQ-ACK and second scheduling information.

Embodiment 7

Figure 7:
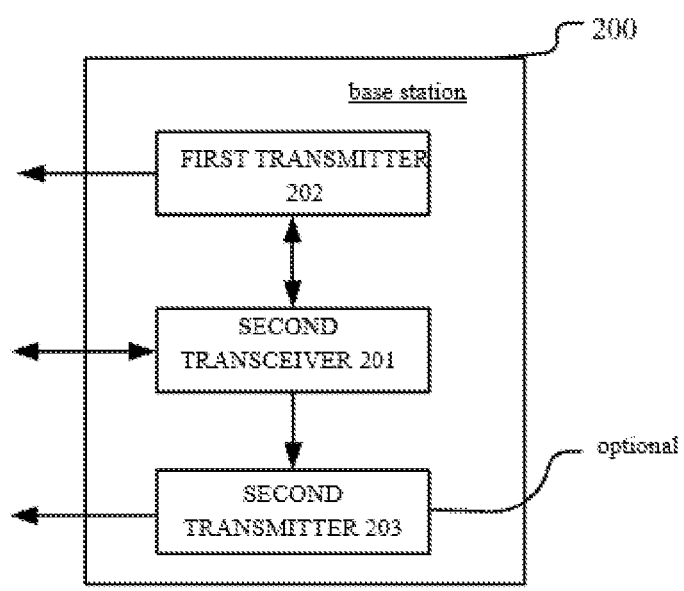
FIG. 7 is a block diagram illustrating the structure of a processing device in a base station according to an embodiment of the present disclosure.

Embodiment 7 is a block diagram illustrating the structure of a processing device in a base station, as shown in FIG. 7. In FIG. 7, the base station processing device 200 includes a second transceiver 201, a first transmitter 202, and a second transmitter 203. The second transmitter 203 is optional.

The second transceiver 201 receives a first radio signal in a first time window; the first radio signal includes at least first information between first information and first data.

In Embodiment 7, the first information is used to determine whether a transmitter of the first information detects a first signaling in a second time window; the second time window is behind the first time window in time-domain; the first signaling includes first scheduling information; the first scheduling information includes at least one of an MCS, an NDI, an RV, a HARQ process number, scheduled time domain resources, and scheduled frequency domain resources.

In one embodiment, the first information includes 1 information bit.

If the first information is used to determine that the transmitter of the first information detects the first signaling in a second time window:

the first transmitter 202 transmits the first signaling in the second time window; and the second transceiver 201 receives the second radio signal.

wherein the first scheduling information comprised in the first signaling is for a second radio signal, and the first information is used to determine that a transmitter of the first information detects the first signaling in the second time window.

In one embodiment of Embodiment 7, if the first information is used to determine that the transmitter of the first information does not detect the first signaling in the second time window, the second transceiver 201 performs blind detection in a first resource pool, and receives a third radio signal in the target time-frequency resources; the first information is used to determine that a transmitter of the first information does not detect the first signaling in the second time window; the target time-frequency resources belong to the first resource pool; the third radio signal includes at least one of second information and second data; the second information is used to determine whether the transmitter of the first information detects the first signaling in a fourth time window; the fourth time window is behind the target time-frequency resources in time-domain.

In one embodiment of Embodiment 7, the second transceiver 201 further transmits the third information in the fourth time window; the third information is used to determine the first information.

In one embodiment of Embodiment 7, the above base station 200 further includes a second transmitter 202; the second transmitter 202 transmits the second signaling if the first information is used to determine that the transmitter of the first information does not detect the first signaling in the second time window; the second signaling includes only a HARQ-ACK between a HARQ-ACK and second scheduling information, the HARQ-ACK indicates whether the first data is correctly decoded, and the first radio signal includes the first information and the first data; the second scheduling information includes an MCS, an NDI, an RV, a HARQ process number, scheduled time domain resources, and scheduled frequency domain resources.

The ordinary skill in the art may understand that all or part steps in the above method may be implemented by instructing related hardware through a program. The program may be stored in a computer-readable storage medium, for example Read-Only Memory (ROM), hard disk or compact disc, etc. Preferably, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to mobile phones, tablet computers, notebooks, vehicle communication devices, wireless sensors, network cards, Internet of Things terminals, RFID terminals, NB-IOT terminals, Machine Type Communication (MTC) terminals, enhanced MTC (eMTC) terminals, data cards, network cards, vehicle communication devices, low-cost mobile phones, low-cost tablets and other wireless communication devices. The base station in the present disclosure includes, but is not limited to, a macro-cellular base station, a micro-cellular base station, a home base station, a relay base station, and other wireless communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in user equipment for wireless communication, comprising:
   transmitting a first radio signal in a first time window, wherein the first radio signal comprises a first information and first data;
   self-determining target time-frequency resources in a first resource pool; and
   transmitting a third radio signal on the target time-frequency resources;
   wherein the first information is used to determine whether the UE detects a first signaling in a second time window; the second time window is behind the first time window in time-domain; the first signaling comprises first scheduling information; and the first scheduling information comprises at least one of a Modulation and Coding Scheme, a New Data Indicator, a Redundancy Version, a HARQ process number, scheduled time domain resources, and scheduled frequency domain resources; and
   wherein the first information is used to determine that the user equipment does not detect the first signaling in the second time window, the third radio signal comprises a second information and second data; the second information is used to determine whether the user equipment detects the first signaling in a third time window; and the third time window is behind the target time-frequency resources in time-domain.

2. The method according to claim 1, comprising:
   receiving a second signaling;
   wherein the second signaling comprises only a HARQ-ACK between a HARQ-ACK and second scheduling information, the HARQ-ACK indicates whether the first data is correctly decoded, the first radio signal comprises the first information and the first data; and the second scheduling information comprises a Modulation and Coding Scheme, a New Data Indicator, a Redundancy Version, a HARQ process number, scheduled time domain resources, and scheduled frequency domain resources.

3. The method according to claim 1, comprising:
   receiving third information in a fourth time window;
   wherein the third information is used to determine the first information.

4. A method in a base station for wireless communication, comprising:
   receiving a first radio signal in a first time window, wherein the first radio signal comprises a first information and first data;
   performing blind detection in a first resource pool; and
   receiving a third radio signal in target time-frequency resources;
   wherein the first information is used to determine whether a transmitter of the first information detects a first signaling in a second time window; the second time window is behind the first time window in time-domain; the first signaling comprises first scheduling information; and the first scheduling information comprises at least one of a Modulation and Coding Scheme, a New Data Indicator, a Redundancy Version, a HARQ process number, scheduled time domain resources, and scheduled frequency domain resources; and
   wherein the first information is used to determine that the user equipment does not detect the first signaling in the second time window, the third radio signal comprises a second information and second data; the second information is used to determine whether the user equipment detects the first signaling in a third time window; and the third time window is behind the target time-frequency resources in time-domain.

5. The method according to claim 4, comprising:
   transmitting the first signaling in the second time window; and
   receiving a second radio signal;
   wherein the first scheduling information comprised in the first signaling is for the second radio signal, and the first information is used to determine that the transmitter of the first information detects the first signaling in the second time window.

6. The method according to claim 4, comprising:
   transmitting a second signaling;
   wherein the second signaling comprises only a HARQ-ACK between a HARQ-ACK and the second scheduling information, the HARQ-ACK indicates whether the first data is correctly decoded, the first radio signal comprises the first information and the first data; and the second scheduling information comprises a Modulation and Coding Scheme, a New Data Indicator, a Redundancy Version, a HARQ process number, scheduled time domain resources, and scheduled frequency domain resources.

7. The method according to claim 4, comprising:
   transmitting third information in a fourth time window;
   wherein the third information is used to determine the first information.

8. A user equipment for wireless communication, comprising:
   a first transceiver configured to:
     transmit a first radio signal in a first time window, the first radio signal comprises a first information and first data;
     self-determine target time-frequency resources in a first resource pool; and
     transmit a third radio signal on the target time-frequency resources;
   wherein the first information is used to determine whether the user equipment detects a first signaling in a second time window; the second time window is behind the first time window in time-domain; the first signaling comprises first scheduling information; and the first scheduling information comprises at least one of a Modulation and Coding Scheme, a New Data Indicator, a Redundancy Version, a HARQ process number, scheduled time domain resources, and scheduled frequency domain resources; and;

wherein the first information is used to determine that the user equipment does not detect the first signaling in the second time window, the third radio signal comprises a second information and second data; the second information is used to determine whether the user equipment detects the first signaling in a third time window; and the third time window is behind the target time-frequency resources in time-domain.

9. The user equipment according to claim 8, comprising: a second receiver receiving a second signaling;

wherein the second signaling comprises only a HARQ-ACK between a HARQ-ACK and second scheduling information, the HARQ-ACK indicates whether the first data is correctly decoded, the first radio signal comprises the first information and the first data; and the second scheduling information comprises a Modulation and Coding Scheme, a New Data Indicator, a Redundancy Version, a HARQ process number, scheduled time domain resources, and scheduled frequency domain resources.

10. The user equipment according to claim 8, wherein the first transceiver further receives third information in a fourth time window; the third information is used to determine the first information.

11. A base station for wireless communication, comprising:

a second transceiver configured to:

receive a first radio signal in a first time window, the first radio signal comprises a first information and first data;

perform blind detection in a first resource pool; and receive a third radio signal in target time-frequency resources;

wherein the first information is used to determine whether a transmitter of the first information detects a first signaling in a second time window; the second time window is behind the first time window in time-domain; the first signaling comprises first scheduling information; and the first scheduling information comprises at least one of a Modulation and Coding Scheme, a New Data Indicator, a Redundancy Version, a HARQ process number, scheduled time domain resources, and scheduled frequency domain resources; and wherein the first information is used to determine that a transmitter of the first information does not detect the first signaling in the second time window; the target time-frequency resources belong to the first resource pool; the third radio signal comprises a second information and second data; the second information is used to determine whether the transmitter of the first information detects the first signaling in a third time window; and the third time window is behind the target time-frequency resources in time-domain.

12. The base station according to claim 11, comprising: a first transmitter transmitting the first signaling in the second time window;

wherein the first scheduling information comprised in the first signaling is for a second radio signal, and the first information is used to determine that a transmitter of the first information detects the first signaling in the second time window; and the second transceiver further receives the second radio signal.

13. The base station according to claim 11, comprising: a second transmitter transmitting a second signaling;

wherein the second signaling comprises only a HARQ-ACK between a HARQ-ACK and second scheduling information, the HARQ-ACK indicates whether the first data is correctly decoded, the first radio signal comprises the first information and the first data; and the second scheduling information comprises a Modulation and Coding Scheme, a New Data Indicator, a Redundancy Version, a HARQ process number, scheduled time domain resources, and scheduled frequency domain resources.

14. The base station according to claim 11, wherein the second transceiver further transmits third information in a fourth time window; the third information is used to determine the first information.

* * * * *